3,836,464
FILTER SCREEN MOUNTING
Richard H. Brookins, Pomona, and John Paul Miller, Garden Grove, Calif., assignors to Brown International Corporation, Covina, Calif.
Filed July 14, 1972, Ser. No. 272,053
Int. Cl. B01d 29/04
U.S. Cl. 210—413
4 Claims

ABSTRACT OF THE DISCLOSURE

A power filter has an apertured back-up plate mounted in a circular opening in a stationary member. One or more substantially flat circular screens are positioned in the opening adjacent the back-up member, and their outer peripheries are secured relative to the stationary member. A threaded element mounted centrally on the back-up member applies an axial force to the screens to deflect them away from the back-up member and to place them in tension. A rotary impeller in the opening is placed closely adjacent the tensioned screens and has blades shaped to conform thereto.

---

This invention relates to filter apparatus and is particularly directed to an improved mounting for filter screens. In conventional mountings for flat screens used in filtering operations, it is customary to provide an apertured back-up plate contacting the downstream side of the filter screen. Since the holes in the filter screen are much smaller than those in the back-up plate, the back-up plate blanks out a large portion of the filter screen surface and renders it ineffective.

In accordance with this invention, a substantially flat circular filter screen is mounted in an opening within a stationary member and the peripheral portion of the screen is clamped or otherwise secured to the member. A screen tensioning device is provided for deflecting the screen axially to place it in tension. In a typical installation, an apertured back-up plate adjacent the filter screen is provided with a tensioning screw for applying an axial force to the center of the filter screen to deflect it away from the back-up plate. In this way, maximum through-put of filter medium is achieved because the full area of the filter screen is available for filtration, and the back-up plate does not blank out any of the screen surface. Moreover, the desired tension is maintained in the filter screen for optimum performance. The filter screen ordinarily takes the form of a flat circular disk prior to mounting and tensioning. One or more filter screens may be employed with progressively decreasing size of openings.

A rotary impeller may be placed adjacent the filter screen and the blades of the impeller are preferably shaped to conform to the shape of the filter screen under tension.

Other and more detailed objects and advantages will appear hereinafter.

Figure 1:
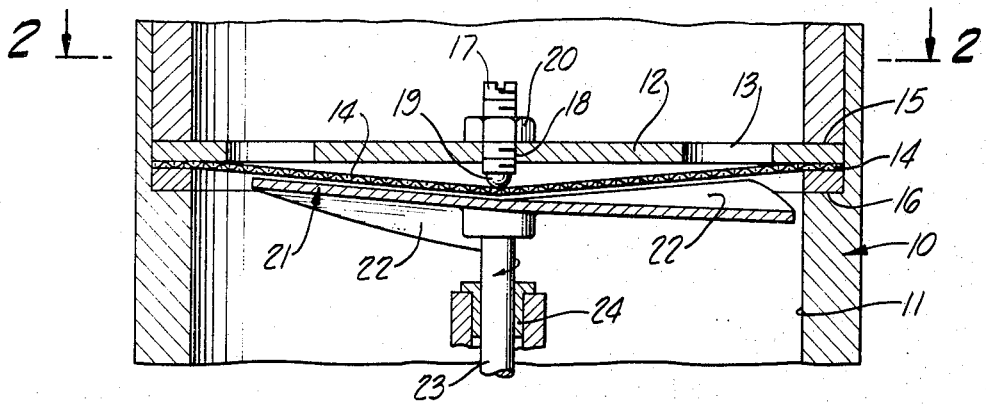
Figure 3:
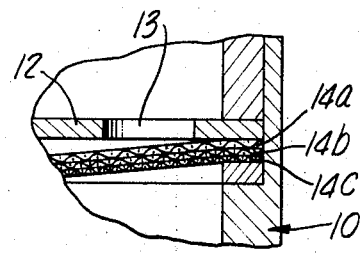
Figure 2:
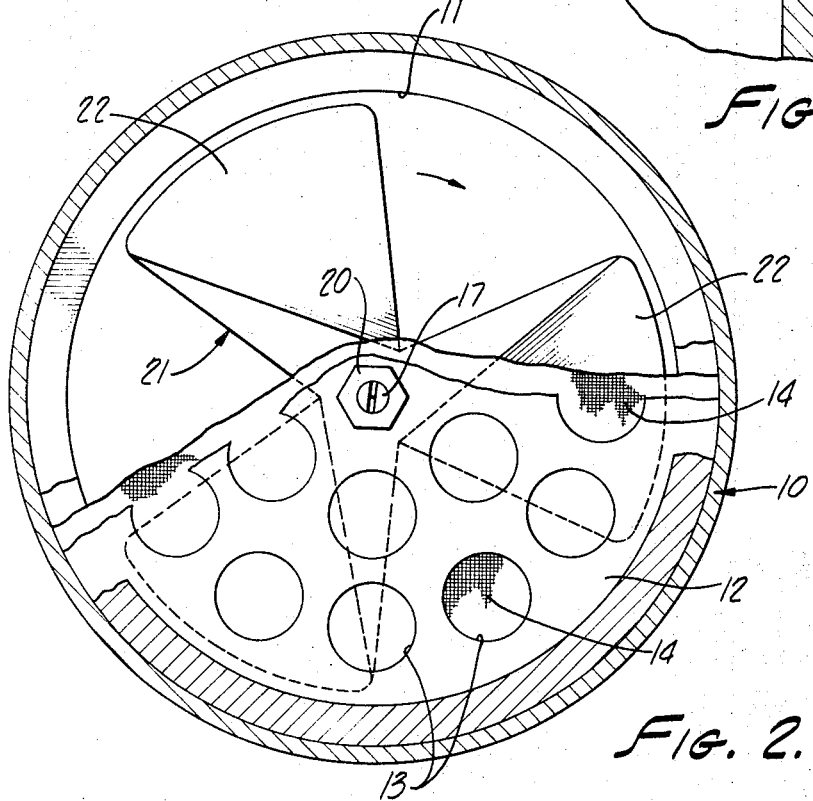

In the drawings:
FIG. 1 is a sectional elevation showing a preferred embodiment of this invention.
FIG. 2 is a sectional plan view partly broken away taken substantially on the lines 2—2 as shown in FIG. 1.
FIG. 3 is a sectional detail similar to FIG. 1 showing a modification.

Referring to the drawings, the stationary member generally designated 10 has a central circular opening 11 for passage of a filter medium. A back-up plate 12 having apertures 13 extends across the opening and is secured to the stationary member 10. A substantially flat circular filter screen 14 is positioned adjacent the back-up plate 12 on one side thereof. The outer periphery of the filter screen 14 as well as the outer periphery of the back-up plate 12 are clamped between the shoulders 15 and 16 on the stationary member 10.

A tensioning screw 17 is received in a threaded opening 18 in the center of the back-up plate 12 and the projecting end 19 contacts the center of the filter screen 14. The tension screw 17 deflects the center of the filter screen 14 to move it away from the back-up plate 12 and to place it in tension. A lock nut 20 holds the screw 17 in adjusted position.

A rotary impeller 21 is mounted in the opening 11 and provided with a plurality of blades 22 which are shaped to conform to the tensioned screen 14 with small running clearance. The impeller 21 may be carried on an axial shaft 23 mounted in one or more bearings 24. The shaft 23 and impeller 21 are driven by any convenient means, not shown.

The screen 14 is tensioned sufficiently to provide optimum filtering action with flow taking place in either direction. Moreover, the space developed between the tensioned screen 14 and the back-up plate 12 serves to avoid blanking of the filter screen by the solid portions of the back-up plate 12 between the apertures 13. The full area of the filter screen is available for filtration.

The term "substantially flat circular screen" as used in this specification is intended to cover a screen which is deflected slightly out of a flat plane by a tensioning means.

In the modified form of the invention shown in FIG. 3, a plurality of filter screens 14a, 14b and 14c are employed instead of a single screen. The openings in the screens 14a, 14b and 14c are progressively smaller, in that order. The peripheries of these screens are clamped to the stationary member 10 and the same tensioning means is employed as described above.

Having fully described our invention, it is to be understood that we are not to be limited to the details herein set forth but that our invention is of the full scope of the appended claims.

We claim:

1. In a power filter, a stationary member having a circular opening, an apertured back-up plate in the opening, a substantially flat screen extending across said opening adjacent said back-up plate, means on the stationary member for securing the outer peripheries of the back-up plate and the screen thereto, means for applying an axial force to said screen to deflect it away from said back-up plate and place it in tension, and a rotary impeller in said opening positioned closely adjacent said screen.

2. The combination set forth in claim 1 in which said impeller has blades shaped to conform to the deflected screen.

3. The combination set forth in claim 1 in which the latter said means acts against the center of the screen.

4. The combination set forth in claim 1 in which the latter said means is mounted on the back-up plate.

References Cited

UNITED STATES PATENTS

| 1,897,572 | 2/1933 | Cornell, Jr. | 210—314 X |
| 2,647,767 | 8/1953 | Anderson | 210—445 X |
| 3,507,392 | 4/1970 | Alexander et al. | 210—415 X |

JOHN ADEE, Primary Examiner

U.S. Cl. X.R.

210—445, 446, 451, 489